United States Patent
Hattori et al.

(10) Patent No.: US 6,345,221 B2
(45) Date of Patent: Feb. 5, 2002

(54) CONTROL APPARATUS OF VEHICLE EQUIPPED WITH A CONTINUOUSLY VARIABLE TRANSMISSION AND CONTROL METHOD OF THE SAME

(75) Inventors: Yuji Hattori, Bisai; Kenji Matsuo, Toyota; Hiroji Taniguchi, Toyota; Katsumi Kono, Toyota; Tadashi Tamura, Aichi-ken; Hideki Yasue, Toyota, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/756,270

(22) Filed: Jan. 9, 2001

(30) Foreign Application Priority Data

Jan. 26, 2000 (JP) ......................... 12-017558 P
May 19, 2000 (JP) ......................... 12-149088 P

(51) Int. Cl.$^7$ ............................................. B60K 17/04
(52) U.S. Cl. .............................. 701/51; 427/7; 427/15; 427/37; 123/319; 123/339.14
(58) Field of Search ............................ 701/51; 477/37, 477/7, 15, 34, 91, 107; 123/319, 339.14, 349

(56) References Cited

U.S. PATENT DOCUMENTS

| | | | |
|---|---|---|---|
| 4,720,793 A | | 1/1988 | Watanabe et al. |
| 5,035,215 A | * | 7/1991 | Ohchi .................... 123/339.18 |
| 5,674,145 A | * | 10/1997 | Kidokoro et al. ........... 475/192 |
| 5,967,940 A | * | 10/1999 | Yamaguchi ................. 477/107 |
| 5,976,054 A | * | 11/1999 | Yasuoka ..................... 477/48 |
| 6,090,007 A | * | 7/2000 | Nakajima et al. ............. 477/46 |

FOREIGN PATENT DOCUMENTS

| JP | 60081559 A | 5/1985 |
|---|---|---|
| JP | 62110525 A | 5/1987 |
| JP | 11078619 A | 3/1999 |

* cited by examiner

Primary Examiner—William A. Cuchlinski, Jr.
Assistant Examiner—Olga Hernandez
(74) Attorney, Agent, or Firm—Oblon, Spivak, McClelland, Maier & Neustadt, P.C.

(57) ABSTRACT

A control apparatus is provided in a vehicle equipped with a power source and a continuously variable transmission. The continuously variable transmission is connected to the power source. The control apparatus includes a target power determinator, a target revolutions determinator, a determining device, a setting device and a target torque determinator. The target power determinator determines a target power of the power source. The target revolutions determinator determines target revolutions on the basis of the target power. The determining device determines whether the vehicle is a transient driving condition or not. The setting device sets the target revolutions as setting revolutions when the determining device determines that the vehicle is not in the transient driving condition. The setting device sets revolutions different from the target revolutions as the setting revolutions when the determining device determines that the vehicle is in a transient driving condition. The target torque determinator determines a target output torque of the power source on the basis of the target power and the setting revolutions. Since the vehicle is controlled in accordance with the driving condition of the vehicle, a jerky feeling can be avoided and ride quality or drivability of the vehicle is prevented from being deteriorated, even when the vehicle is in a transient driving condition.

21 Claims, 10 Drawing Sheets

CONTROL APPARATUS OF VEHICLE EQUIPPED WITH A CONTINUOUSLY VARIABLE TRANSMISSION AND CONTROL METHOD OF THE SAME

INCORPORATION BY REFERENCE

The disclosure of each of Japanese Patent Applications No. HEI 12-017558 filed on Jan. 26, 2000 and No. HEI 12-149088 filed on May 19, 2000, including the specification, drawings and abstract, is incorporated herein by reference in their entirety.

BACKGROUND OF THE INVENTION

1. Field of the Invention

The present invention relates to a control apparatus which is provided in a vehicle equipped with a continuously variable transmission (hereinafter, referred to simply as "CVT") and a control method of the control apparatus. A speed ratio of the CVT is continuously variable, and the CVT is connected to an output side of a power source of the vehicle.

2. Description of Related Art

As a transmission for a vehicle, for example, a belt type or a Troydal type CVT is known. The belt type CVT consists of an input pulley, an output pulley, a belt, and the like. A width of a groove of each pulley is variable. Each portion of the belt which wraps each pulley takes a shape of a partial circle. A radius of the circle of each pulley can be continuously varied by making the groove width of the input pulley smaller and the groove width of the output pulley greater, or vice versa. As a result, a speed ratio of the belt type CVT can be continuously varied. Here, the speed ratio is a ratio of input revolutions per minute against output revolutions per minute of the CVT. Hereinafter, revolutions per minute are referred to simply as "revolutions".

The Troydal type CVT consists of a pair of disks (that is, an input disk and an output disk), a power roller, and the like. Each disk has a Troydal face, and the power roller is disposed between both disks such that the power roller contacts each Troydal face. By slanting the power roller, an input radius is increased and an output radius is decreased, or vice versa. Here, the input radius is a distance between an axis of the input disk and a point on which the input disk makes contact with the power roller. In the same way, the output radius is a distance between an axis of the output disk and a point on which the output disk makes contact with the power roller. Consequently, the speed ratio of the Troydal type CVT can be continuously changed.

When a vehicle is equipped with one of the above-mentioned CVTs connected to the output side of an engine, engine revolutions can be smoothly controlled by continuously changing the speed ratio on the basis of a driving condition such as a vehicle speed, a required driving force (which is controlled by an accelerator angle, or the like), and the like. One example of a control device in which the lowest fuel consumption of the engine is achieved by effectively using such a characteristic of the CVT is shown in Japanese Laid-Open Patent Application No. 11-78619. In the control device described therein, a target driving force of a vehicle is determined on the basis of the accelerator angle or the like. A target power of the engine to obtain the target driving force is determined. Target output revolutions of the engine are calculated based on the target power, so that the lowest fuel consumption is achieved. The speed ratio of the CVT is controlled so that the actual output revolutions of the engine are equal to the target output revolutions. On the other hand, a target output torque of the engine for generating the above-mentioned target power is calculated by using a known formula, that is, torque multiplied by revolutions is equal to power. The engine is controlled so that an actual output torque of the engine is equal to the target output torque. By the aforementioned control, the fuel economy of the engine can be improved.

Next, a technique which was already known before the aforementioned Japanese Laid-Open Patent Application No. 11-78619 publication, will be described. In this technique, the target output torque of the engine is calculated by using the actual output revolutions of the engine. The target output torque fluctuates in response to the fluctuation of the actual output revolutions of the engine. When the vehicle is running, the engine is connected to wheels of the vehicle. Consequently, torque is not only transmitted from the engine to the wheels, but torque is also transmitted from the wheels to the engine. Force from the road surface is inputted to the wheels, so that torque to the engine is generated. For example, when the vehicle runs on a rough road, the output revolutions of the engine fluctuate, in accordance with the fluctuation of the load inputted to the wheels. Consequently, the target output torque of the engine varies because the output revolutions of the engine vary, although the target power of the engine is maintained constant. Furthermore, the control of the output torque of the engine has an inevitable minute delay. Consequently, when the engine is controlled so that the output torque of the engine is equal to the target output torque, the driving force fluctuates because of a phase difference between the output torque and the output revolutions of the engine. A jerkiness of the vehicle may therefore occur.

In the control apparatus described in the above publication, the target output torque of the engine is calculated by dividing the target power by the target output revolutions. This control prevents the target output torque of the engine from fluctuating.

However, when a driver depresses an accelerator pedal of the vehicle suddenly and strongly, the accelerator angle increases radically. Subsequently, a difference between the target output revolutions and the actual output revolutions of the engine becomes larger because the target output revolutions of the engine are higher in accordance with increasing of the target driving force. When the target output torque of the engine is calculated by using the target output revolutions, the driving force of the vehicle is lower than the driving force required by the driver. The acceleration performance of the vehicle therefore does not satisfy the acceleration performance required by the driver because the engine is controlled only based on minimum fuel consumption. Consequently, the engine performance is lower and the driver may not be satisfied with the drivability of the vehicle.

SUMMARY OF THE INVENTION

It is thus one object of the present invention to solve the aforementioned problems.

Another object of the invention is to restrain the fluctuation of the driving force which is caused by the load to the vehicle from outside.

yet another object is to improve the drivabilty of the vehicle by outputting enough torque from the power source in a transient driving condition of the vehicle.

According to the invention, the above and other objects are achieved by a control apparatus in a vehicle which is equipped with a power source and a continuously variable transmission. The continuously variable transmission is connected to the power source. The apparatus comprises a target power determinator, a target revolutions determinator, determining means, setting means, and a target torque determinator. The target power determinator determines a target power of the power source. The target revolutions determinator determines target revolutions on the basis of the target power. The determining means determines whether or not the vehicle is in a transient driving condition. The setting means sets the target revolutions as the setting revolutions when the determining means determines that the vehicle is not in the transient driving condition. Furthermore, the setting means sets revolutions different from the target revolutions as the setting revolutions when the determining means determines that the vehicle is in the transient driving condition. The target output torque determinator determines a target output torque of the power source on the basis of the target power and the setting revolutions.

When the vehicle is in a stable driving condition, it is determined that the vehicle is not in the transient driving condition and the target output torque of the power source is set on the basis of the target revolutions of the power source. Consequently, even though the actual output revolutions of the power source fluctuate by receiving a load from road surface when the vehicle runs on a rough road, the target output torque of the power source does not fluctuate. Consequently, the drivability of the vehicle is not deteriorated. Furthermore, when the vehicle is in the transient driving condition, the target output torque of the power source is calculated by using revolutions different from the target revolutions, for example, such as the actual output revolutions of the power source. Since the driving torque of the vehicle responds to the actual driving condition and the engine performance is not deteriorated, the drivability of the vehicle is improved.

BRIEF DESCRIPTION OF THE DRAWINGS

The above and other objects, features, advantages, and technical and industrial significance of this invention will be better understood by reading the following detailed description of a presently preferred embodiment of the invention, when considered in connection with the accompanying drawing, in which.

DETAILED DESCRIPTION OF PREFERRED EMBODIMENTS

Figure 9:
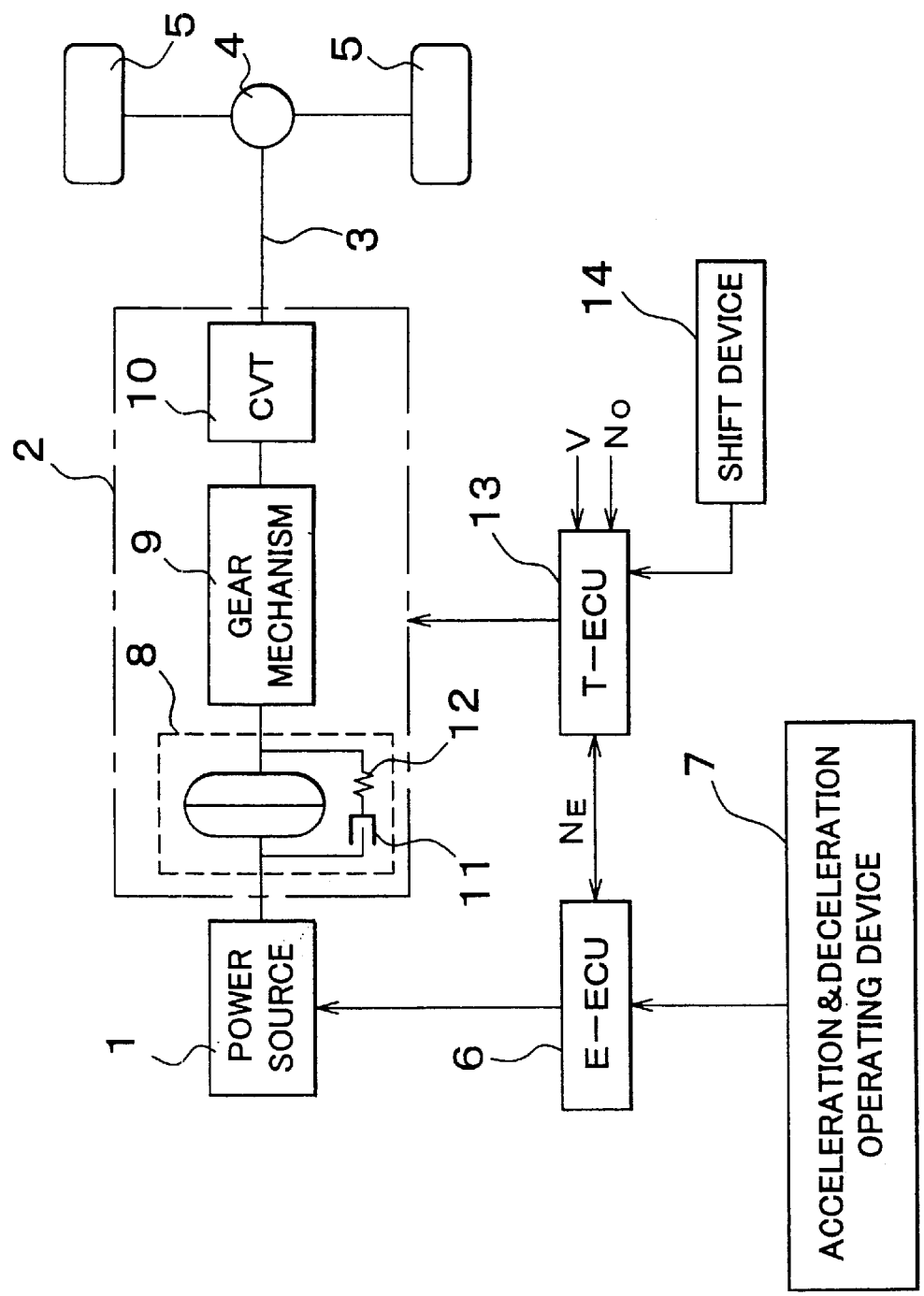
FIG. 9 is a schematic block diagram illustrating one example of system constructions of a vehicle equipped with a CVT, and to which the present invention is applied.

In the following description and the accompanying drawings, the present invention will be described in more detail in terms of specific embodiments. First, one example of powertrains for a vehicle to which the present invention is applied will be explained. In FIG. 9, a power source 1 is connected to a speed change mechanism 2. An output shaft 3 of the speed change mechanism 2 is connected to left and right wheels 5 by way of a differential 4. Here, the wheels 5 may be front wheels (in this case, the vehicle is a front engine, front drive type). The wheels 5 may also be rear wheels (in this case, the vehicle is a front engine and rear drive type). Furthermore, the control apparatus of the present invention is applicable to a four-wheel-drive vehicle, in which power from a power source 1 is transmitted to front and rear wheels. Incidentally, the power source 1 may be an internal combustion engine such as a gasoline engine, a diesel engine, and the like, or the power source 1 may be an electric motor. Moreover, the power source 1 may be constructed by combining an internal combustion engine and an electric motor.

As the power source 1, a direct injection gasoline engine is here adopted (hereinafter, the power source 1 will be referred to as the engine 1). In the direct injection engine 1, fuel is directly injected into each cylinder of the engine 1, and a homogeneous charge combustion or a stratified charge combustion can be achieved by controlling the amount of fuel and the timing of fuel injection. An electronic throttle valve is adopted for electronically controlling an accelerator angle of the engine 1.

This engine 1 is electronically controlled. An electronic control unit (E-ECU) 6 mainly consisting of microcomputers is provided, and the E-ECU 6 electronically controls the engine 1. The E-ECU 6 controls at least an output torque of the engine 1. For this, control the E-ECU receives required values such as output revolutions NE of the engine 1, an accelerator angle θ, and the like.

These required values are signals for increasing or decreasing the output torque of the engine 1. One example of the required values is sent from an acceleration and deceleration operating device 7 (such as an accelerator pedal which a driver operates). The amount of the accelerator pedal operated by the driver can be converted to an electric signal. Furthermore, a signal of an opening angle of the electronic throttle valve can be adopted. The required value may be a signal from a cruise control system (not shown in the figures) provided for maintaining a predetermined constant speed of a vehicle.

The speed change mechanism 2 consists of a hydraulic power transmission 8, a gear mechanism 9, and a CVT 10. The hydraulic power transmission 8 transmits torque from an input portion to an output portion via fluid such as oil. A torque converter which is commonly equipped in a vehicle can be applied to the hydraulic power transmission 8. In this case, the hydraulic power transmission 8 includes a direct clutch 11, a damper 12 and a torque converter. The direct clutch 11 connects the input portion to the output portion of the hydraulic power transmission 8 by way of mechanical means, such as friction members or the like. The damper 12 consists of elastic bodies, such as a coil spring or the like. The damper 12 attenuates vibrations of the power train when the direct clutch 11 is engaged and the input and output portions of the hydraulic power transmission 8 are mechanically connected.

The input portion of the hydraulic power transmission 8 is connected to an output shaft of the engine 1 and the output portion is connected to an input shaft of the gear mechanism 9. The gear mechanism 9 has a plurality of gears, and a speed ratio of the speed change mechanism 2 can be suitably changed by changing a route for transmitting torque via the gears of the gear mechanism 9. Furthermore, a rotating direction of an output shaft of the gear mechanism 9 can be opposite that of the rotating direction of the input shaft of the gear mechanism 9. As the gear mechanism 9, a single pinion type planetary gear, a double pinion type planetary gear, a Ravigneaux type planetary gear or the like is used. A gear mechanism 9 in which constantly meshed gears in pairs are connected by synchronizers may also be used for the gear mechanism 9.

The gear mechanism 9 can compensate for a narrow range of a speed ratio of the CVT 10. The gear mechanism 9 also enables the speed change mechanism 2 to rotate in a reverse direction, to compensate for the fact that the CVT 10 cannot rotate in a reverse direction. Accordingly, if the CVT 10 has a wide enough range of speed ratio, a simple gear mechanism having the function of reversing the direction, and not having the function of widening the speed ratio range, may be adopted as the gear mechanism 9. Hereinafter, a simple gear mechanism only having the reverse function is referred to as the gear mechanism 9.

Figure 10:
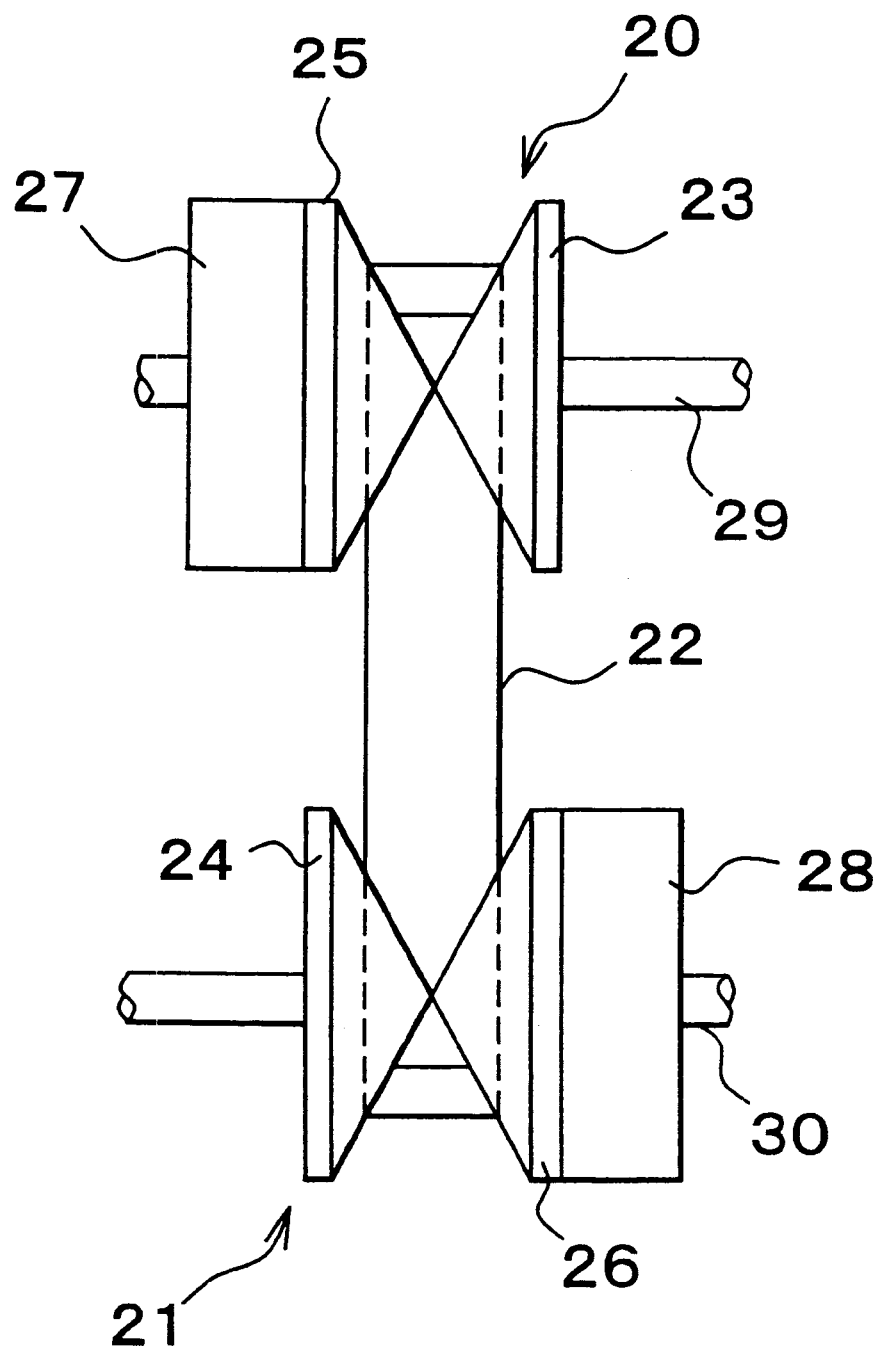
FIG. 10 is a schematic view showing a main portion of a belt type CVT as one example of the CVT.

In the CVT 10 shown in FIG. 9, the speed ratio can be continuously changed in a stepless manner. Here, the speed ratio is a ratio of revolutions of an input shaft of the CVT 10 (hereinafter called "CVT input shaft") per revolution of an output shaft of the CVT 10 (hereinafter called "CVT output shaft"). A belt type CVT, a Troydal type CVT or another type of CVT is applied as the CVT 10. Here, one example of the belt type CVT is illustrated in FIG. 10. Hereinafter, the CVT indicates a belt type CVT.

The CVT 10 has a primary pulley 20, a secondary pulley 21 and a belt 22. The primary pulley 20 is connected to a CVT input shaft 29, and the secondary pulley 21 is connected to a CVT output shaft 30. The CVT output shaft 30 is connected to the output shaft 3 of the speed change mechanism 2 shown in FIG. 9. The CVT input shaft 29 is disposed parallel to the CVT output shaft 30. (cf. As a schematic explanation, the CVT input shaft is coaxial to the CVT output shaft in FIG. 9.) The belt 22 partially wraps both pulleys 20 and 21. The primary pulley 20 comprises a fixed sheave 23 and a movable sheave 25. The movable sheave 25 is moved closer to or away from the fixed sheave 23. That is, a groove width between both sheaves 23 and 25 is variable. A hydraulic actuator 27 is provided for pushing the movable sheave 25 toward the fixed sheave 23. In the same way, the secondary pulley 21 comprises a fixed sheave 24 and a movable sheave 26. The movable sheave 26 is moved closer to or away from the fixed sheave 24. That is, a groove width between both sheaves 24 and 26 is variable. A hydraulic actuator 28 is provided for pushing the movable sheave 26 toward the fixed sheave 24.

Based on the accelerator angle θ, oil pressure is applied to the hydraulic actuator 28, which controls the secondary pulley 21. This oil pressure gives tension to the belt 22 so that the belt can transmit torque between the pulleys. On the other hand, oil pressure is applied to the hydraulic actuator 27 which controls the primary pulley 20, so that revolutions of the CVT input shaft 29 (that is, the input revolutions of the CVT 10) are equal to target input revolutions of the CVT 10 (described later in detail). The speed ratio of the CVT 10 is controlled by applying oil pressure to the hydraulic actuator 27, so that output revolutions of the engine 1 are equal to target output revolutions of the engine 1 (also described later in detail).

The radius of a partial circle of the belt 22 wrapping either pulley 20 or 21 is increased or decreased by changing the respective groove widths of both pulleys 20 and 21. In this way, the speed ratio of the CVT 10 is changed. Here, the groove width of the pulley 20 is a clearance between the fixed sheave 23 and the movable sheave 25, and in the same manner the groove width of the pulley 21 is a clearance between the fixed sheave 24 and the movable sheave 26. The speed ratio is changed by feedback-controlling the pressure oil to the primary pulley 20 on the basis of a difference between the actual input revolutions and the target input revolutions of the CVT 10, or on the basis of a difference between the actual output revolutions and the target output revolutions of the engine 1. Accordingly, the larger the difference is, the faster the speed ratio is changed.

When the radius of the partial circle of the belt 22 wrapping the primary pulley 20 is minimum and the radius of the partial circle of the belt 22 wrapping the secondary pulley 21 is maximum, the speed ratio in the lowest vehicle speed range (that is, the maximum speed ratio) is set to ηmax. On the contrary, when the radius of the partial circle of the belt 22 wrapping the primary pulley 20 is maximum and the radius of the partial circle of the belt 22 wrapping the secondary pulley 21 is minimum, the speed ratio in the highest vehicle speed range (that is, the minimum speed ratio) is set to ηmin.

Engaging or disengaging the direct clutch 11 of the hydraulic power transmission 8 (shown in FIG. 9) and half-engagement with slip of the direct clutch 11 are controlled based on the driving condition of the vehicle. The speed ratio of the CVT 10 is also controlled on the basis of the driving condition of the vehicle. To execute this control, the electronic control unit (T-ECU) 13, mainly made of microcomputers, controls the speed change mechanism 2.

The T-ECU 13 communicates with the E-ECU 6 for the engine 1 by giving or receiving data. Data such as the vehicle speed V, revolutions No of the output shaft 3 of the speed change mechanism 2 and the like, are stored in the T-ECU 13, and the data are used for the aforementioned control. A shift device 14 selects one of the shift positions, such as parking (P), reverse (R), neutral (N), drive (D) and the like, of the speed change mechanism 2. In the D position, the speed ratio is automatically set according to the running condition of the vehicle. The shift device 14 is electronically connected to the E-ECU 13.

When the accelerator angle θ is changed by comparatively small amount (that is, in a stable driving condition where the driving force required for the wheels 5 is changed comparatively little), the target output revolutions of the engine 1 or the target input revolutions of the CVT 10 are calculated in the E-ECU 6 and the T-ECU 13, on the basis of the required driving force. On the other hand, the target output torque of the engine 1 is calculated based on a target power P and the target output revolutions of the engine 1, or based on the target power P and the target input revolutions of the CVT 10.

In the transient driving condition where the changing width of the required driving force of the wheels 5 is comparatively great, however, the target output torque of the engine 1 is set by a different method from the above-mentioned one in the stable driving condition. The specific method will be described later in detail. One example of the control methods in the stable and transient driving conditions will be hereinafter explained as a first embodiment of the present invention.

Figure 1:
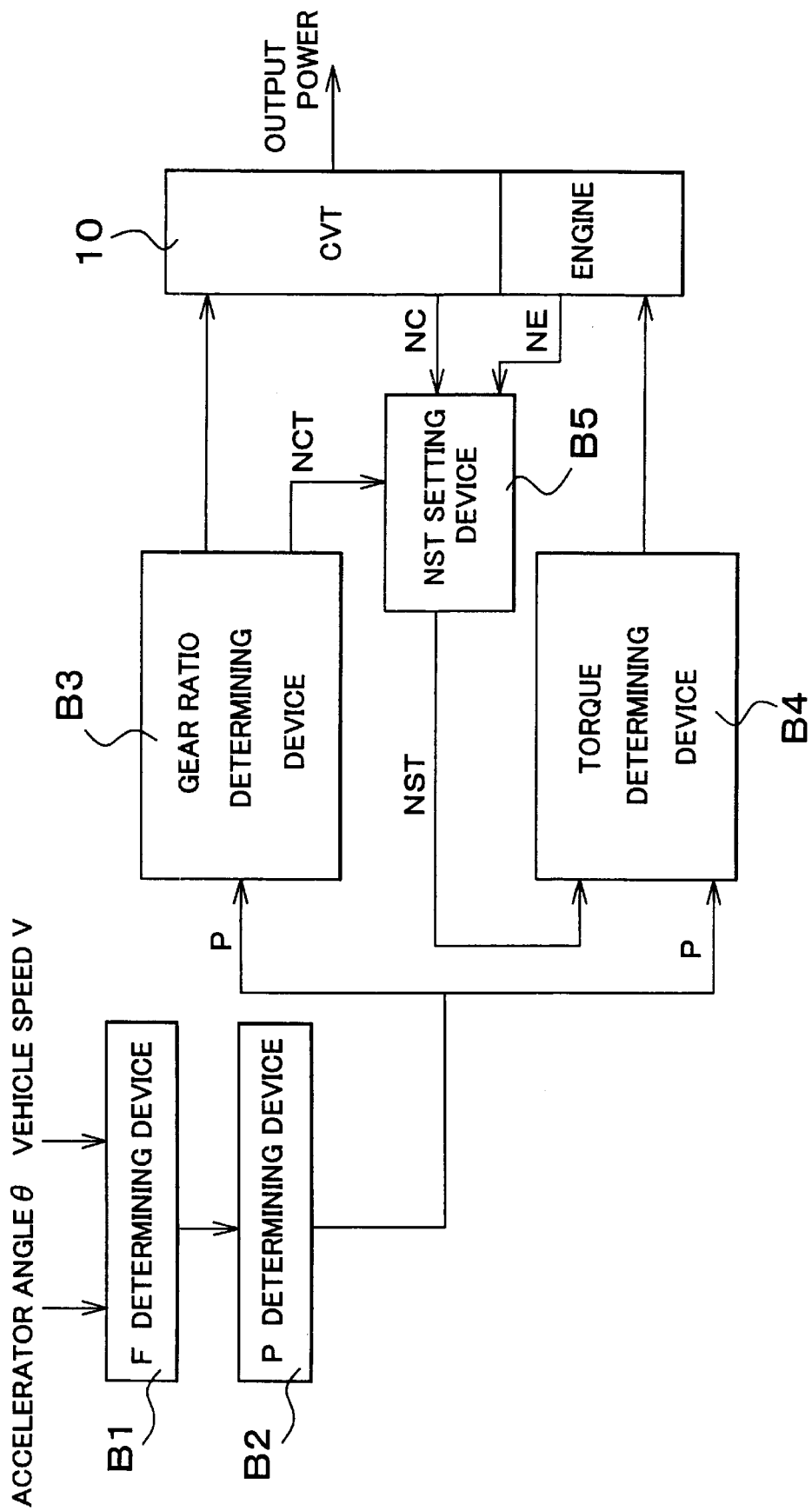
FIG. 1 is a diagram showing a control executed in the control apparatus as one example in first and second embodiments of the present invention.

The details will be described using FIG. 1. FIG. 1 is a diagram showing one example of a control executed in the control apparatus of the first embodiment of the present invention. A force F determining device B1 determines a target driving force F. That is, the target driving force F is determined based on the accelerator angle θ and a vehicle speed V (or a corresponding value of the vehicle speed V). Next, a target power P determining device B2 determines the target power P. That is, the target power P is determined on the basis of the target driving force F and the vehicle speed V. Here, the target power P indicates a target value of the power that the engine 1 should output. The target driving force F can be determined according to a preset map employing the accelerator angle θ and the vehicle speed V as parameters. The target power P is calculated by multiplying the product of the target driving force F and the vehicle speed V by a constant (or by dividing the product of the target driving force F and the vehicle speed V by a constant). Or, the target power P is obtained by a predetermined map based on the target driving force F and the vehicle speed V.

A gear ratio determining device B3 controls the speed ratio of the CVT 10. Target revolutions are determined on the basis of the target power P. In the case of focusing on the engine 1, the target revolutions are target output revolutions NET. In the other case of focusing on the continuously variable transmission 10, the target revolutions are target input revolutions NCT. The latter case will be explained. The control value of the CVT 10 is determined so that the input revolutions (hereinafter called "input revolutions NC") of the CVT are equal to the target input revolutions NCT. In an internal combustion engine such as a gasoline engine or the like, the output revolutions (hereinafter called "output revolutions NE") of the engine can be determined so that the fuel consumption of the engine is minimum for the value of the power. Here, when the output revolutions NE that yield an optimum fuel consumption according to each power value are prepared as a map, the output revolutions NE of the engine 1 corresponding to the target power P can be determined by the map. Here, as mentioned above, since the hydraulic power transmission 8 and the gear mechanism 9 are disposed between the engine 1 and the CVT 10, the relation between the output revolutions NE of the engine 1 and the input revolutions NC of the CVT 10 has a predetermined mechanical characteristic. Consequently, a map showing the relation between the target power P and the target input revolutions NCT of the CVT 10 can be made. That is, either the target input revolutions NCT of the CVT 10 or the target output revolutions NET of the engine 1 can be determined.

The revolutions of the CVT output shaft 30 are determined by the vehicle speed V. Accordingly, when the target input revolutions NCT of the CVT 10 are first determined in the gear ratio determining device B3, the revolutions of the input and output sides of the CVT 10 are determined. The speed ratio of the CVT 10 is then determined. Specifically, the oil pressures applied to the movable sheaves 25 and 26 are set in the belt type CVT 10. The control signals corresponding to the oil pressures are sent to the CVT 10.

On the other hand, the control of the engine 1 is executed in a torque determining device B4. In the torque determining device B4, a target output torque (hereinafter called "target output torque TET") of the engine 1 is determined. It is generally known that power is calculated by dividing the product of torque and revolutions by a coefficient. Consequently, the target output torque TET of the engine 1 is calculated by dividing the target output power P by setting revolutions NST and multiplying the result by a constant K. Incidentally, the setting revolutions NST will be explained later in detail. Here, the setting revolutions NST will be concisely described. The setting revolutions NST are revolutions for determining a target input torque TCT of the CVT 10 or the target output torque TET of the engine 1. In a certain case, the target input revolutions NCT are set, and in another case the actual input revolutions NC of the CVT 10 are set, as the setting revolutions NST. Or the target output revolutions NET are set in a certain case, and in another case the actual output revolutions NE are set as the setting revolutions NST.

Other methods as follows are also available. A map which shows the relations among the target power P, the target input revolutions NCT of the CVT 10, the target input torque TCT, and the target output torque TET is prepared in advance. The target output torque TET of the engine 1 is set using the map. The target output torque of the CVT 10 may be set using another map which shows the relations among the target power P, the target output revolutions NET, and the target output torque TET of the engine 1.

The output torque TE of the engine 1 is determined on the basis of an intake air amount and a fuel amount of the engine 1. Accordingly, the intake air amount and the fuel amount are determined based on the target output torque TET. The control signal corresponding to the intake air amount and the fuel amount is sent to the engine 1.

As a control method for achieving the target power P, there are a control method based on the input revolutions NC of the CVT 10 and another control method based on the output revolutions NE of the engine 1. Since the hydraulic power transmission 8 and the gear mechanism 9 are disposed between the engine 1 and the CVT 10, the relation of the output revolutions NE of the engine 1 and the input revolutions NC of the CVT 10 has a mechanically fixed characteristic. Accordingly, either the former method or the latter is available. Since the direct clutch 11 shown in FIG. 9 is engaged under most driving condition, the output revolutions NE of the engine 1 are equal to the input revolutions NC of the CVT 10. Consequently, both of the above-mentioned control methods are the same in most driving condition. Even when the direct clutch 11 is not engaged, if the direct clutch 11 is half-engaged and a slight slip occurs in the hydraulic power transmission 8, the output revolutions NE of the engine 1 can be treated as being substantially equal to the input revolutions NC of the CVT 10. Accordingly, in the following explanation, the former method, that is the method of controlling based on the input revolutions of the CVT 10, is mainly described. In this control method, the target input revolutions NCT are determined by paying attention to the input revolutions NC of the CVT 10, and the speed ratio of the CVT 10 is controlled so that the input revolutions NC of the CVT 10 reache the target input revolutions NCT of the CVT 10. At the same time, the engine 1 is controlled so that an output torque TE of the engine 1 is equal to the target output torque TET of the engine 1. Incidentally, in the latter method, the input revolutions NC of the CVT 10 are replaced with the output revolutions NE of the engine 1, and the target input revolutions NCT of the CVT 10 are replaced with the target output revolutions NET.

A NST setting device B5 is important for the engine 1 to achieve the target power P. The NST setting device B5 determines whether or not the vehicle is in a transient driving condition, and the B5 sets the setting revolutions NST. Next, how to set the setting revolutions NST will be explained.

$$[\text{Case 1}] |NCT-NC| \leq \alpha \tag{1}$$

The actual input revolutions NC of the CVT 10 are compared with the target input revolutions NCT of the CVT 10. When an absolute value of the difference between the input revolutions NC and the target input revolutions NCT is equal to or less than $\alpha$, it is determined that the vehicle is not in a transient driving condition. Subsequently, the target input revolutions NCT of the CVT 10 are adopted as the setting revolutions NST. That is, NST=NCT. Such a case occurs when a changing width of the accelerator angle $\theta$ is rather small, and in this case the vehicle is in a stable driving condition. The target output torque TET of the engine 1 is calculated as TET=K×P/NCT, or the target output torque TET of the engine 1 is determined by the above-mentioned preset map.

$$[\text{Case 2}] |NCT-NC| \leq \beta \tag{2}$$

Contrary to the aforementioned [Case 1], when the absolute value of the difference between the input revolutions NC and the target input revolutions NCT of the CVT 10 is equal to or more than $\beta$, the input revolutions NC of the CVT 10 are adopted as the setting revolutions NST. That is, NST=NC. Here, $\beta$ is larger than $\alpha$. This [Case 2] occurs when the changing width of the accelerator angle $\theta$ is rather large and it is determined that the vehicle is under a transient driving condition. The target output torque TET of the engine 1 is calculated as TET=K×P/NC, or by the predetermined map.

$$[\text{Case 3}] \alpha < |NCT-NC| < \tag{3}$$

When the absolute value of the difference between the input revolutions NC and the target input revolutions NCT of the CVT 10 is between $\beta$ and $\alpha$, it is determined that the vehicle is in a transient driving condition. Revolutions calculated by assigning each predetermined weight to the target input revolutions NCT and the input revolutions NC of the CVT 10 are adopted as the setting revolutions NST. For example, the setting revolutions NST are calculated by using the following equation.

$$NST=NCT-(NCT-NC) \times ((|NCT-NC|)-\alpha)/(\beta-\alpha)) \tag{4}$$

Consequently, the target output torque TET of the engine 1 is calculated as TET=K=P/NST, or by the preset map.

As mentioned above, in the case where the difference between the target input revolutions NCT and the actual input revolutions NC of the CVT 10 is small, the vehicle is in the stable driving condition where the vehicle barely accelerates and/or decelerates, and the vehicle runs substantially at a constant speed. In this case, the target output torque TET is calculated by using the target input revolutions NCT of the CVT 10. Even if the output revolutions NE of the engine 1 or the input revolutions NC of the CVT 10 fluctuate due to a load from the road when the vehicle runs on a rough road, the target input revolutions NCT of the CVT 10 do not fluctuate. Consequently, the target output torque TET of the engine 1 is stable. Accordingly, the output torque TE of the engine 1 does not fluctuate. Since the driving torque of the power train of the vehicle does not fluctuate, a jerky feeling can be avoided and the ride quality or drivability of the vehicle is improved.

When the accelerator pedal is depressed quickly and strongly, the target driving force F increases. In this case, the target output revolutions NET of the engine 1 or the target input revolutions NCT of the CVT 10 increase. Here, the revolutions NET or NCT are determined by using the target power P and by following optimum fuel consumption lines of the engine 1. Consequently, the absolute value of the difference between the target input revolutions NCT and the actual input revolutions NC of the CVT 10 exceeds the aforementioned upper limit $\beta$. In this case, the target output torque TET of the engine 1 is determined by using the input revolutions NC of the CVT 10. Since the input revolutions NC of the CVT 10 are less than the target input revolutions NCT, the calculated target output torque TET of the engine 1 is higher. In response to the gradual increase of the input revolutions NC of the CVT 10, the target output torque TET gradually decreases. Consequently, the output torque TE of the engine 1 does not suddenly decrease.

In the above-mentioned transient driving condition, revolutions different from the target input revolutions NCT of the CVT 10 or revolutions different from the target output revolutions NET of the engine 1 are set as the setting revolutions NST for calculating the target output torque TET of the engine 1. By determining the target output torque TET of the engine 1 and controlling the output torque TE of the engine 1, the jerky feeling can be controlled and the engine performance can be prevented from being deteriorated.

Figure 2:
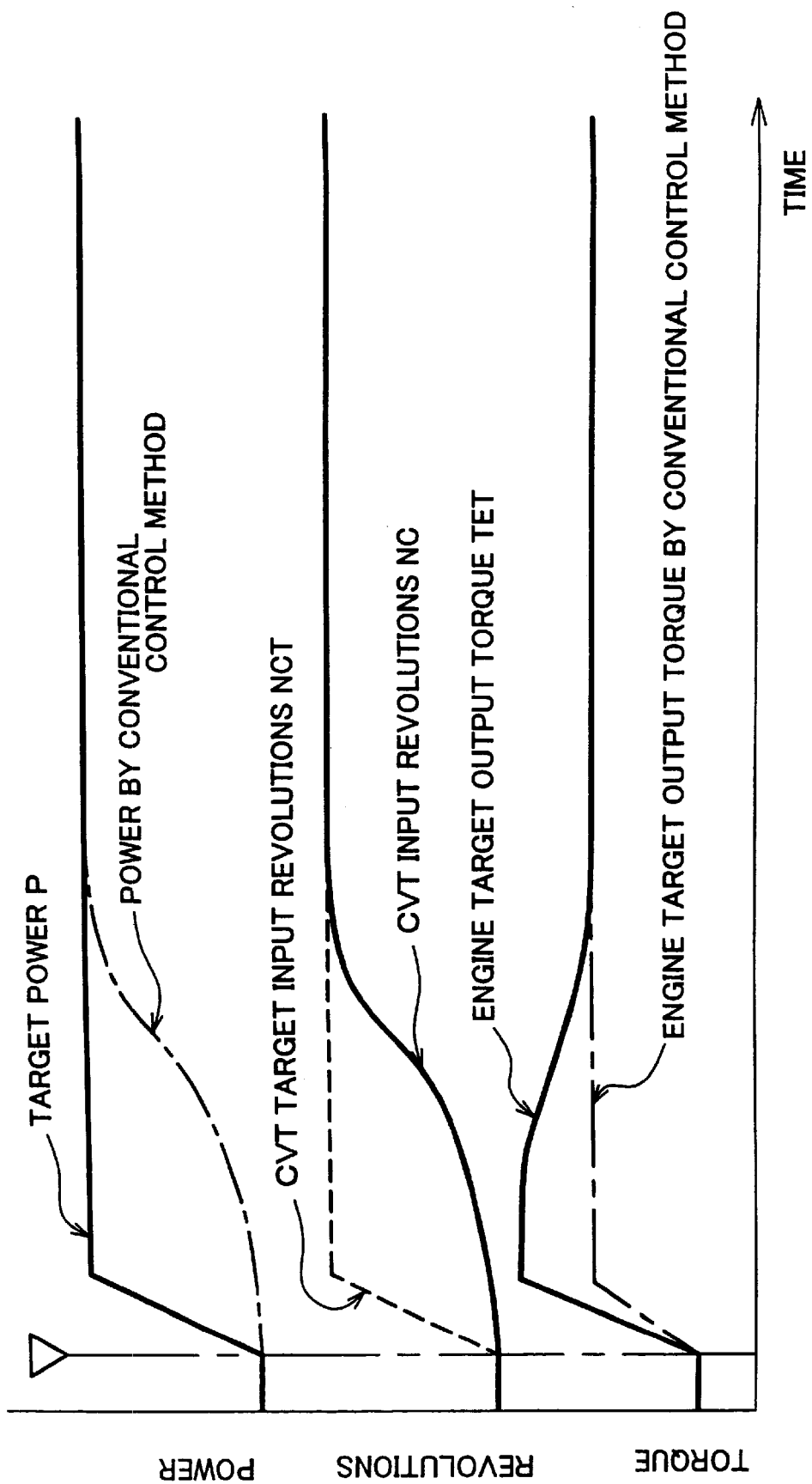
FIG. 2 is a time chart which illustrates transitions of a target power, input revolutions of a CVT, and a target output torque of the engine in a transient driving condition of a vehicle, when the control of the first embodiment of the present invention is executed.

The above-mentioned explanation is shown in FIG. 2. FIG. 2 shows a case where the accelerator pedal is quickly depressed to the maximum limit while the vehicle is running as one example of a transient driving condition. The target input revolutions NCT of the CVT 10 are shown by the dashed line in the middle graph in FIG. 2. On the other hand, the actual input revolutions NC of the CVT 10 change as shown by the solid line in the middle in FIG. 2. In the first stage after the accelerator pedal is quickly depressed as mentioned above, the condition is under the [Case 2]. Accordingly, the input revolutions NC of the CVT 10 are first adopted as the setting revolutions NST. As shown by the solid line in the bottom graph in FIG. 2, the target output torque TET of the engine 1 increases at the initial stage and gradually decreases in response to the increase of the input revolutions NC of the CVT 10. The actual power outputted from the engine 1 is shown by the solid line in the upper graph. This solid line coincides with the target power P. A suitable and sufficient driving condition can be obtained in response to the operation of the accelerator pedal.

For comparison with the above-mentioned control, the chain line in the upper graph indicates one example of the power outputted from the engine 1 with the conventional control method. In the conventional control method, the target input revolutions NCT of the CVT 10 are only set as the setting revolutions NST in any driving condition. The target input revolutions NCT of the CVT 10 suddenly increase as shown by the dashed line in the middle graph. According to this increase, the target output torque TET (shown by the chained line in the bottom graph) is comparatively low. Consequently, the actual power of the engine 1 and the CVT 10 are shown as the chain line in the upper graph, and the actual power is smaller than the target power P of the engine 1 (shown by the solid line in the upper graph). A suitable driving condition according to the operation of the accelerator pedal cannot be obtained.

The substantially left half of the FIG. 2 shows the transient driving condition. In such a transient driving condition, the difference between the target input revolutions NCT and the input revolutions NC of the CVT 10 increases, and subsequently the difference decreases responding to the increasing of the vehicle speed V, as shown in FIG. 2. Afterwards, the difference falls between the upper limit β and the lower limit α. In this case, the target output torque TET of the engine 1 is calculated using the setting revolutions NST calculated by assigning each weight to the target input revolutions NCT and the input revolutions NC of the CVT 10. Since the absolute value of the aforementioned difference gradually becomes smaller, the target output torque TET of the engine 1 becomes close to the target output torque TET of the engine 1 which is calculated on the basis of the target input revolutions NCT of the CVT 10. Consequently, when the driving condition of the vehicle returns from the transient condition to the stable driving condition, the radical change of the target output torque TET of the engine 1 caused by changing the value of the setting revolutions NST from the input revolutions NC of the CVT 10 to the target input revolutions NCT can be avoided. The drivability and the ride quality is prevented from being deteriorated.

Next, a second embodiment of the present invention will be explained. This corresponds to a control for a stepwise change of vehicle condition. When a changing rate of the target input revolutions NCT of the CVT 10 or the target output revolutions NET of the engine 1 is greater than a predetermined value, the stepwise change occurs, and this is called "transient speed change." It is also called the transient speed change when a changing amount or changing rate of accelerator pedal depression exceeds each predetermined value.

Figure 3:
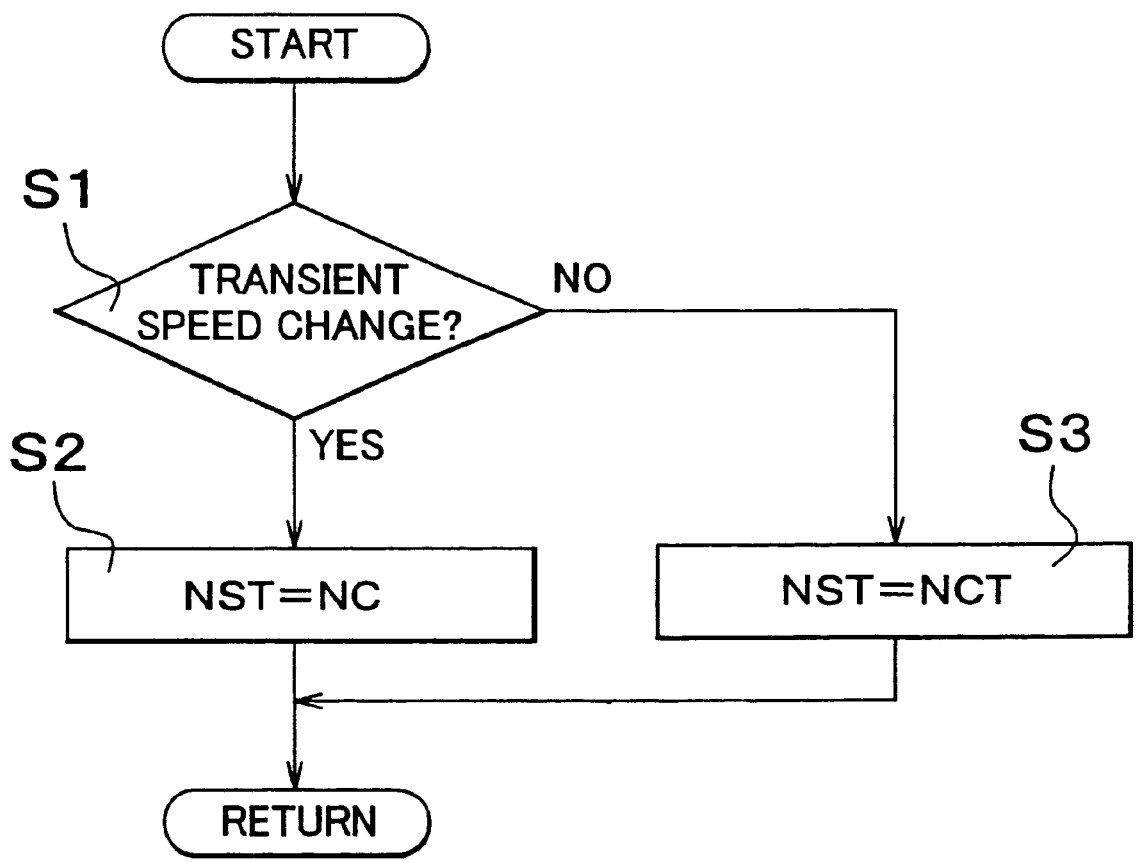
FIG. 3 is one example of a flowchart showing a control executed in B5 (that is, a device for setting revolutions NST which are used for setting the target output torque of the engine) shown in FIG. 1, in the second embodiment of the present invention.

First, FIG. 3 will be explained. In step S1 (hereinafter simply called S1) whether or not a speed change is a transient speed change is determined. This can be determined by whether a transient speed change flag XTRNSFT shown in FIG. 3 is set to 1 or not. When the determination of S1 is affirmative, in S2 the input revolutions NC of the CVT 10 are set as the setting revolutions NST for calculating the target output torque TET of the engine 1. On the contrary, when the determination of S1 is negative, the target input revolutions NCT are set as the setting revolutions NST in S3.

When the target input revolutions NCT of the CVT 10 or the target output revolutions NET of the engine 1 are stepwise changed, or when the accelerator pedal is changed stepwise, the input revolutions NC of the CVT 10 are adopted as the setting revolutions NST which are used for calculating the target output torque TET of the engine 1. As shown FIG. 4 (explained later in detail), though the target input revolutions NCT of the CVT 10 change stepwise, the input revolutions NC of the CVT 10 change smoothly. Since the target output torque TET of the engine 1 is calculated on the basis of the input revolutions NC of the CVT 10, the target output torque TET changes smoothly. Since the output torque TE of the engine 1 is controlled based on the target output torque TET, the output torque TE changes continuously and smoothly. At either time when the normal control (in the stable driving condition) is switched over to the transient control (in the transient speed change condition), or when the transient control is switched over to the normal control, the output torque of the engine 1 can be prevented from fluctuating in the same way.

Incidentally, the input revolutions NC of the CVT 10 are adopted as the setting revolutions NST, in order to prevent the target output torque TET of engine 1 from changing stepwise in response to the stepwise changing of the target input revolutions NCT of the CVT 10. Here, in FIG. 4, the transient speed change condition is from t0 to t2 on the horizontal axis (time axis), and a "step change" condition is from t0 to t1. Here, in place of determining the target output torque TET of the engine 1 on the basis of the input revolutions NC of the CVT 10 in the entire transient speed change period of time from t0 through t2, the target output torque TET may be determined on the basis of the input revolutions NC of the CVT 10 only during step control period (corresponding to the step change) of time from t0 to t1. This indicates that the determination shown in S1 in FIG. 3 can be replaced with the determination made only during step control period of time from t0 to t1.

Figure 4:
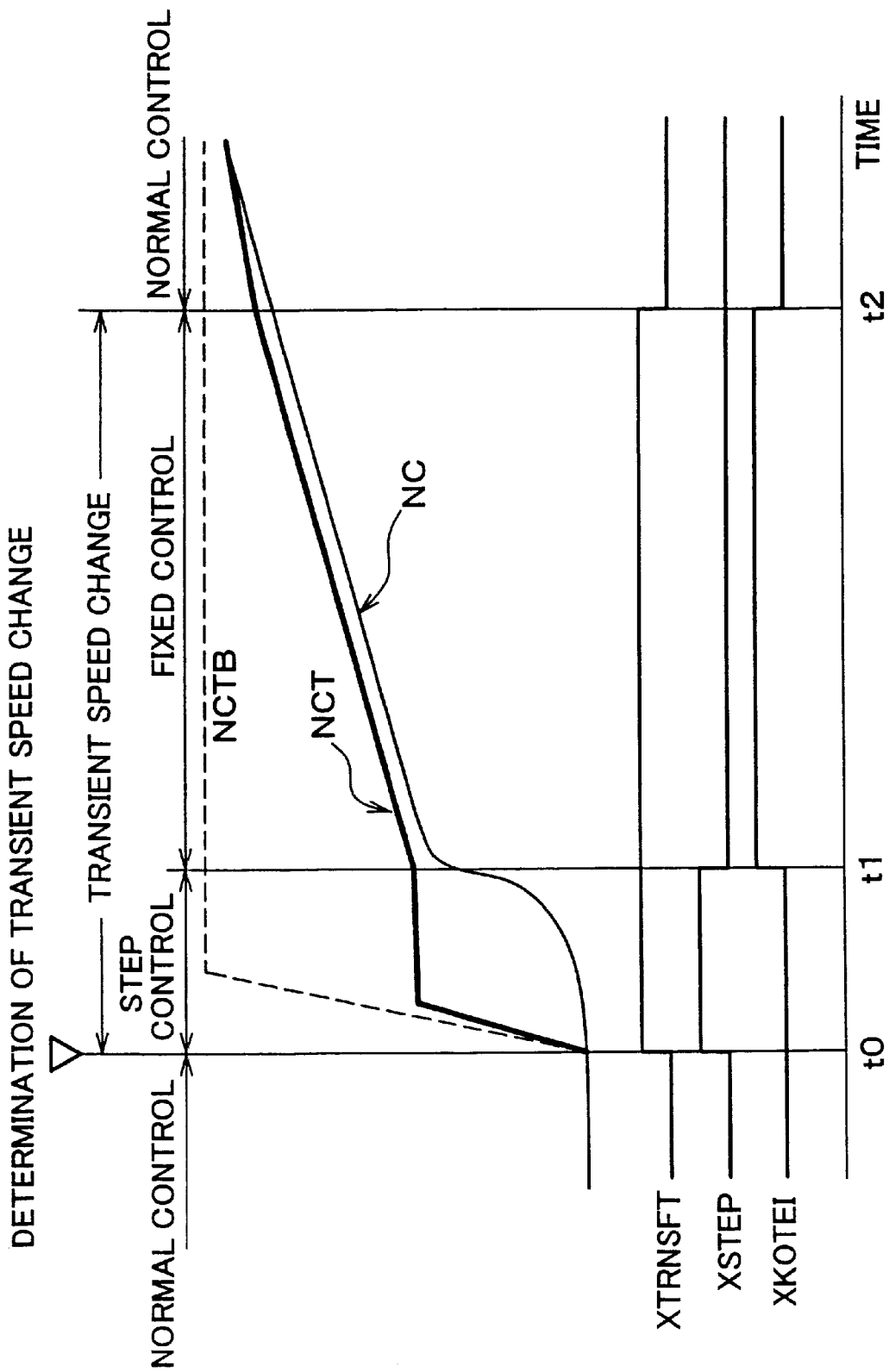
FIG. 4 shows a time chart of the revolutions of the CVT, when the target input revolutions of the CVT are changed stepwise and the flow chart shown in FIG. 3 is executed.

The time t0 in FIG. 4 indicates that it has been determined in S1 that the transient speed change started at this time when the amount of or the changing rate of the accelerator angle θ is high. Basic target input revolutions NCTB (shown by the dashed line) are determined based on the driving condition detected by, for example,the accelerator angle θ, the vehicle speed V, and the like. Furthermore, on the basis of the difference between the actual input revolutions NC and the basic target input revolutions NCTB of the CVT 10, a step width of the target input revolutions NCT of the CVT 10 is calculated. The revolutions calculated by adding the step width to the input revolutions NC of the CVT 10 are set as the target input revolutions NCT. At this time the transient speed change XTRSFT and the step change flag XSTEP are respectively set to "1".

The speed ratio of the CVT 10 is controlled by a feedback control (which is called PI control), on the basis the difference between the target input revolutions NCT and the actual input revolutions NC of the CVT 10. Accordingly, when the target input revolutions NCT of the CVT 10 are stepwise changed as mentioned before, the difference between the target input revolutions NCT and the input revolutions NC of the CVT 10 is large, and the speed ratio of the CVT 10 is rapidly changed. The input revolutions NC of the CVT 10 change as shown by the fine solid line in FIG. 4. The input revolutions NC of the CVT 10 change as a quadratic curve because of a delay in applying the oil pressure and because of the inertia of the rotating members of the CVT 10.

When the difference between the target input revolutions NCT and the input revolutions NC reaches a predetermined value, after the input revolutions NC gradually increase and come close to the target input revolutions NCT, the end of the step control is determined at t1. Subsequently, a fixed speed change control (from t1 to t2) begins. Here, in the fixed speed change control, the target input revolutions NCT of the CVT 10 increase at a constant rate. At the time t1, a step speed change flag XSTEP is reset to "0," and a fixed speed change flag XKOTEI is set to 1. Consequently, the input revolutions NC of the CVT 10 slowly increase corresponding to the target input revolutions NCT of the CVT 10. In this case where the target input revolutions NCT of the CVT 10 change as mentioned above, the input revolutions NC of the CVT 10 change as a quadratic curve, with a slight delay against the target input revolutions NCT.

When the difference between the target input revolutions NCT and the basic target input revolutions NCTB decreases and reaches a predetermined value at the time t2, the end of the transient speed change condition is determined. At this time t2, the transient speed change flag XTRNSFT and the fixed speed change flag XKOTEI are respectively reset to "0." After this point, the normal control is executed, and the target input revolutions NCT of the CVT 10 are set with a lag of a first order against the basic target input revolutions NCTB of the CVT 10. Subsequently, the speed ratio of the CVT 10 is controlled so that the actual input revolutions NC of the CVT 10 are equal to the target input revolutions NCT.

Consequently, in the transient speed change control of the fixed speed change from t1 to t2 and in the succeeding normal control after t2, the target input revolutions NCT of the CVT 10 change as a near rectilinear line. The input revolutions NC of the CVT 10 change following the change in the target input revolutions NCT of the CVT 10. The input revolutions NC of the CVT 10 thus smoothly change in the entire time period of the transient speed change control. Since the target output torque TET of the engine 1 is calculated based on the input revolutions NC of the CVT 10 in the transient speed change, the target output torque TET of the engine 1 smoothly changes over the entire time period. Consequently, a jerky feeling can be avoided, and ride quality or drivability can be prevented from being deteriorated.

A control which is modified from the above-mentioned embodiments is also available and will be described below. Here, the modified control of the first embodiment will be explained. Here, a case where the accelerator pedal is depressed by a large amount at a starting condition of the vehicle will be considered. This case is applied to the above-mentioned transient driving condition, so that the target output torque TET of the engine 1 is determined using the input revolutions NC of the CVT 10. The output torque TE of engine 1 responding to acceleration required at the starting of the vehicle can thus be obtained.

During the period of time from starting to a short time after starting, the input revolutions NC of the CVT 10 begin to pick up from standstill and stay at a low rotating speed, because of a function of the hydraulic power transmission 8. Since the input side of the hydraulic power transmission 8 is connected to the output side of the engine 1, the input side revolutions are rather high, and the output side revolutions of the hydraulic power transmission 8 are rather low. This indicates that a great amount of slip occurs in the hydraulic power transmission 8. In this case the direct clutch 11 is not yet engaged. Subsequently, the amount of slip decreases and the rotating speed of the output side of the hydraulic power transmission 8 increases. Since the CVT input shaft 29 is connected to the output side of the hydraulic power transmission 8, the input revolutions NC of the CVT 10 increase. In this transient condition, if the output revolutions NE of the engine 1 are adopted as the setting revolutions NST, a high value is set as the target output torque TET of the engine 1. Subsequently, the target output torque TET instantly decreases in response to the increase of the output revolutions NE of the engine 1. Consequently, immediately after the driving force of the vehicle becomes high upon starting, the driving force rapidly decreases. This is similar to the phenomenon which occurs when a driver releases the accelerator pedal quickly.

In the NST setting device B5 in FIG. 1, lower limit revolutions NMIN are set as the setting revolutions NST. When the input revolutions NC of the CVT 10 are zero or very low upon the starting of the vehicle, a new value of the lower limit revolutions NMIN is set, and this value is adopted as the setting revolutions NST.

Figure 5:
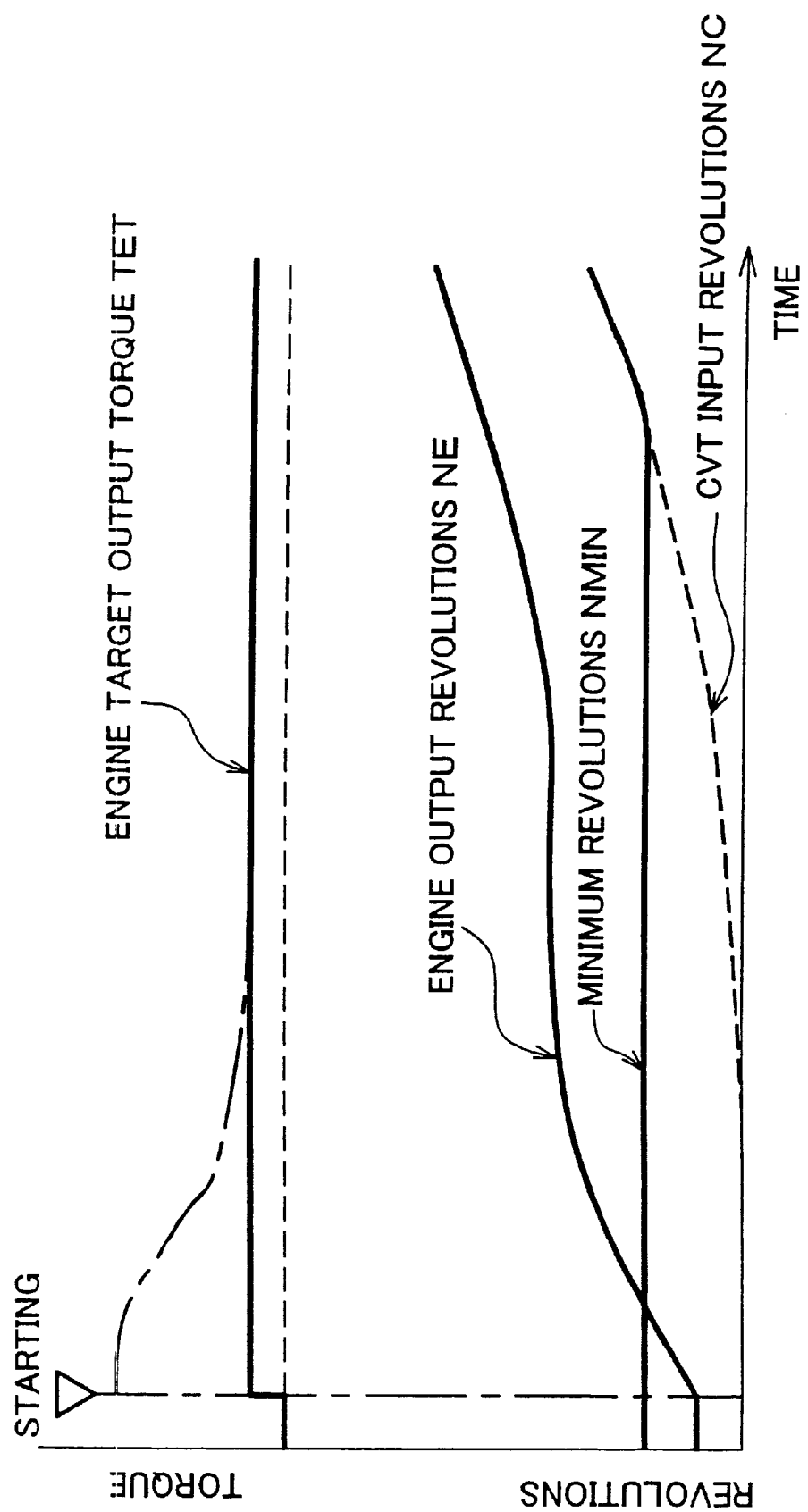
FIG. 5 is a time chart which explains a control at a starting of the vehicle, when minimum revolutions are set for the input revolutions of the CVT.

This transient driving condition controlled as mentioned above is shown in FIG. 5. When a starting operation begins, the output revolutions NE of the engine 1 increase. The actual input revolutions NC of the CVT 10 is kept at zero, because of the slip of the hydraulic power transmission 8. Subsequently, the output revolutions NE of the engine 1 increase, and the slip of the hydraulic power transmission 8 becomes low. The input revolutions NC of the CVT 10 start increasing gradually little by little. As long as the input revolutions NC of the CVT 10 are lower than the lower limit revolutions NMIN, the lower limit revolutions NMIN are adopted as the setting revolutions NST. As a result, the calculated target input torque NCT of the CVT 10 is a constant value according to the lower limit revolutions NMIN. After the input revolutions NC of the CVT 10 increase and reach the lower limit revolutions NMIN, the target output torque TET of the engine 1 is determined on the basis of the input revolutions NC of the CVT 10. Consequently, the output torque TE of the engine 1 is maintained substantially constant. It is possible for the vehicle to smoothly start without a rapid acceleration or deceleration.

In order to compare with the aforementioned control, a case where the output revolutions NE of the engine 1 are adopted as the setting revolutions NST will be explained next. The output revolutions NE of the engine 1, which are used for calculating the target output torque TET of the engine 1, are shown by a solid line in the bottom graph in FIG. 5. The input revolutions NC go up gradually after the starting operation. If the output revolutions NE of the engine 1 are directly adopted as the above-mentioned setting revolutions NST, the target output torque TET of the engine 1 takes a higher value as shown by the chain line in the upper graph. After that, since the output revolutions NE of the engine 1 increase, the target output torque TET of the engine 1 rapidly goes down as shown by the chain line in the upper graph. Since the acceleration performance of the vehicle decreases, immediately after the high driving force is generated responding to the starting operation, this causes the drivability of the vehicle to be deteriorated.

Next, a case where a further different control is added to the first embodiment will be described. In the first embodiment, the target output revolutions NET of the engine 1 or the target input revolutions NCT of the CVT 10 are set so that the fuel consumption of the engine 1 is minimum on the basis of the target power which is determined by the accelerator angle θ or the like. Since the vehicle speed V is not considered in this control, the vehicle speed V does not have any relationship with the target output revolutions NET of the engine 1 or the target input revolutions NCT of the CVT 10. In order to change the output revolutions NE of the engine 1, the target power P, which is the basic value for this control, should be changed. Here, when a condition of the accelerator angle θ is a wide open throttle (WOT), an especially high driving performance is necessary. If the target power P is changed, the engine 1 cannot discharge the full potential of the power, because the output torque TE of the engine 1 decreases.

Figure 6:
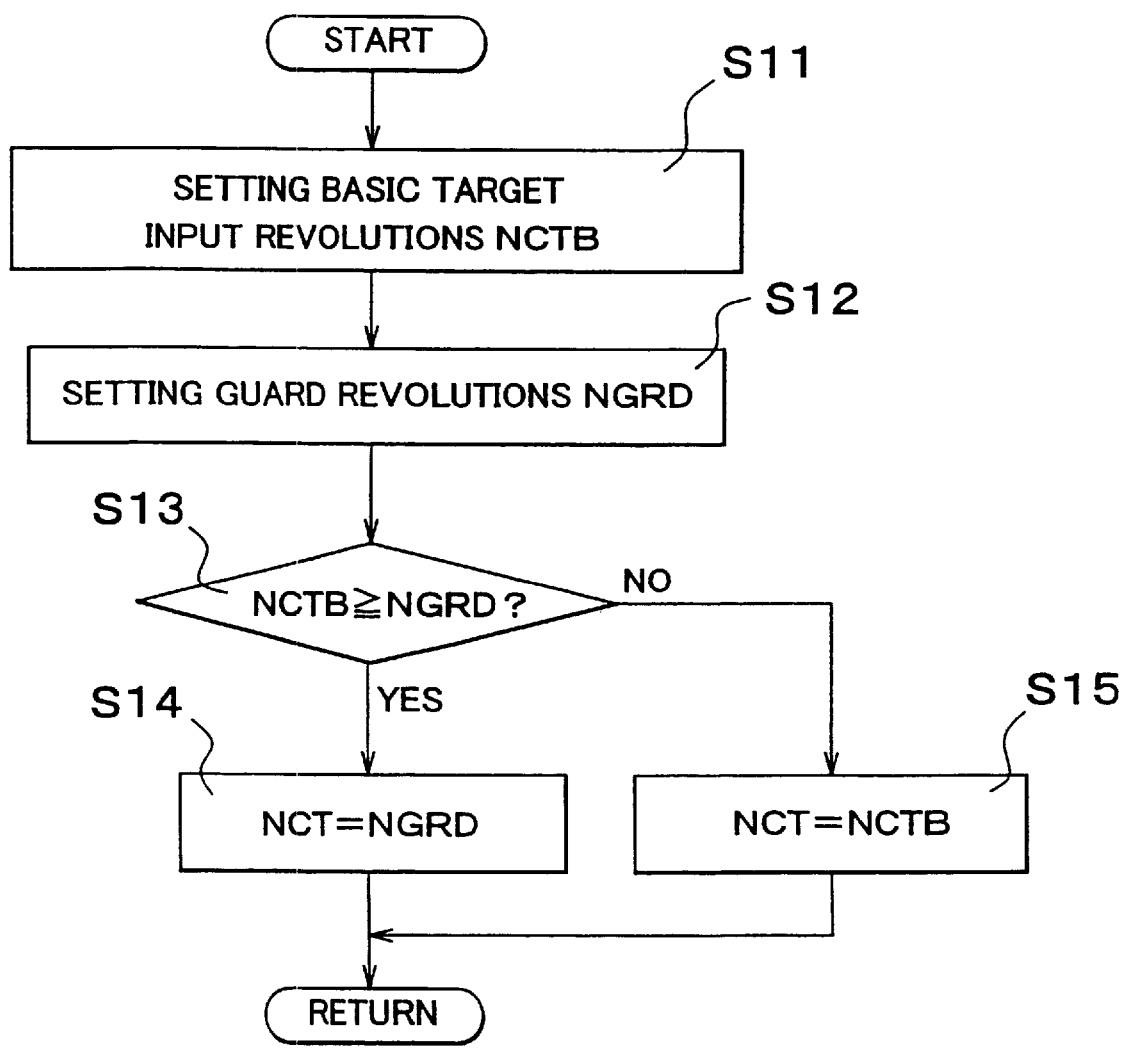
FIG. 6 is one example of a flowchart showing a control when guard revolutions are set for the target input revolutions of the CVT.
Figure 7:
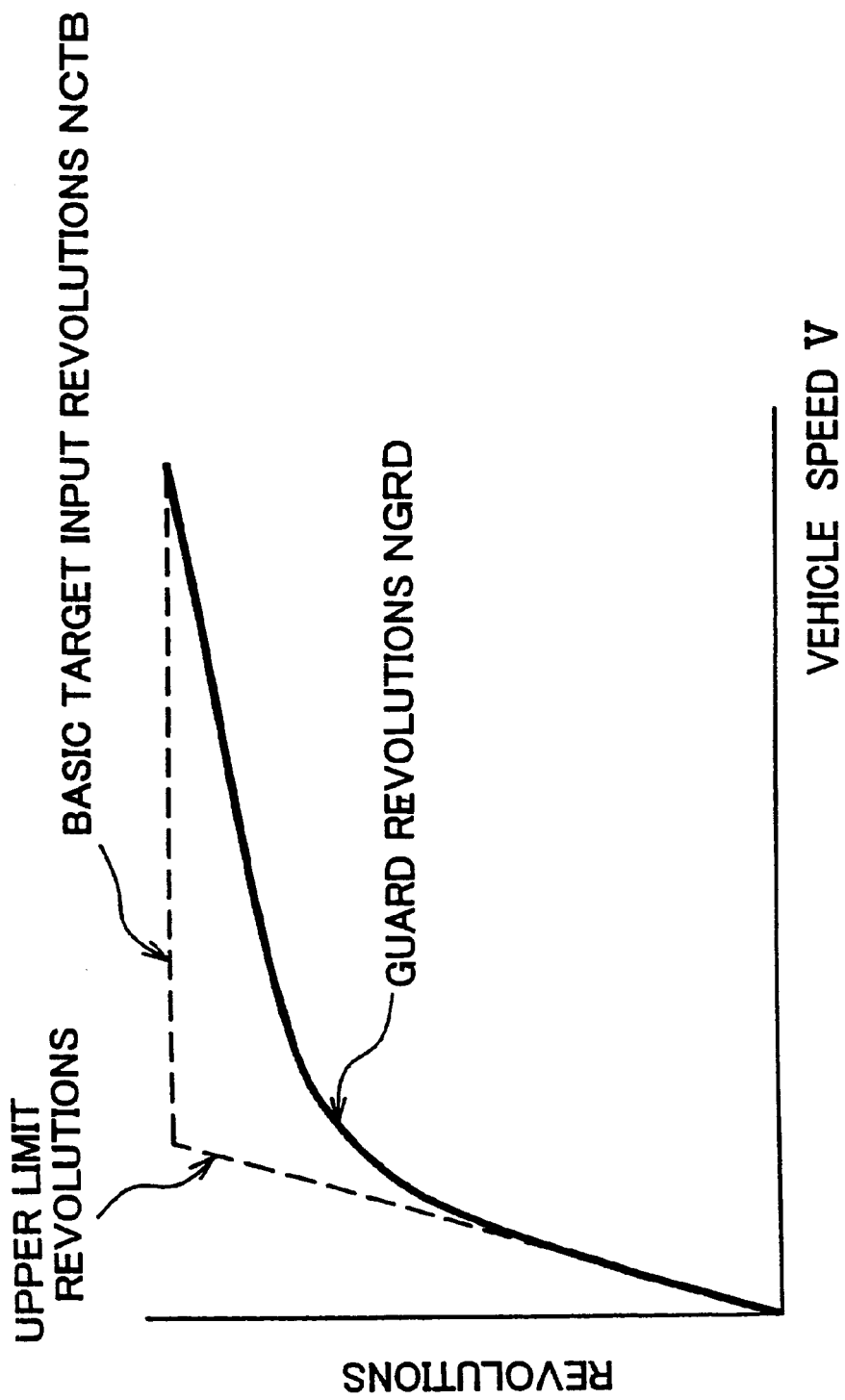
FIG. 7 is one example of a graph showing the guard revolutions for the control shown in FIG. 6.

A control for solving the aforementioned problem will be explained below. FIG. 6 shows one example of this control. First, in S11 the basic target input revolutions NCTB of the CVT 10 are calculated. These values are determined from the map as the revolutions on the minimum fuel consumption line of the engine 1 corresponding to the target power P. The routine then proceeds to S12. In S12, guard revolutions NGRD are calculated. The guard revolutions NGRD are predetermined according to the accelerator angle θ and the vehicle speed V. FIG. 7 shows one example of the WOT condition where the accelerator pedal is depressed to the maximum. The guard revolutions NGRD are lower than the possible upper limit revolutions from the viewpoint of the mechanism of the engine 1, and the guard revolutions NGRD increase in response to the increase of the vehicle speed V.

The routine proceeds to S13. In S13, whether the basic target input revolutions NCTB of the CVT 10 are equal to or greater than the guard revolutions NGRD or not is determined. When determined as "yes", the routine goes to S14. In S14 the guard revolutions NGRD are set as the setting revolutions NST. On the contrary, when the basic target input revolutions NCTB of the CVT 10 are less than the guard revolutions NGRD, the routine proceeds to S15. In S15, the setting revolutions NST are set to the basic target revolutions NCTB of the CVT 10. This indicates that the target input revolutions NCT of the CVT 10 in the WOT condition (where the target driving force is maximum) are restricted by the guard revolutions NGRD which are set in accordance with the vehicle speed V. As mentioned above, the output revolutions NE of the engine 1 determined in relation to the input revolutions NC of the CVT 10 are lower than the output revolutions which are determined on the basis of the minimum fuel consumption line.

Figure 8:
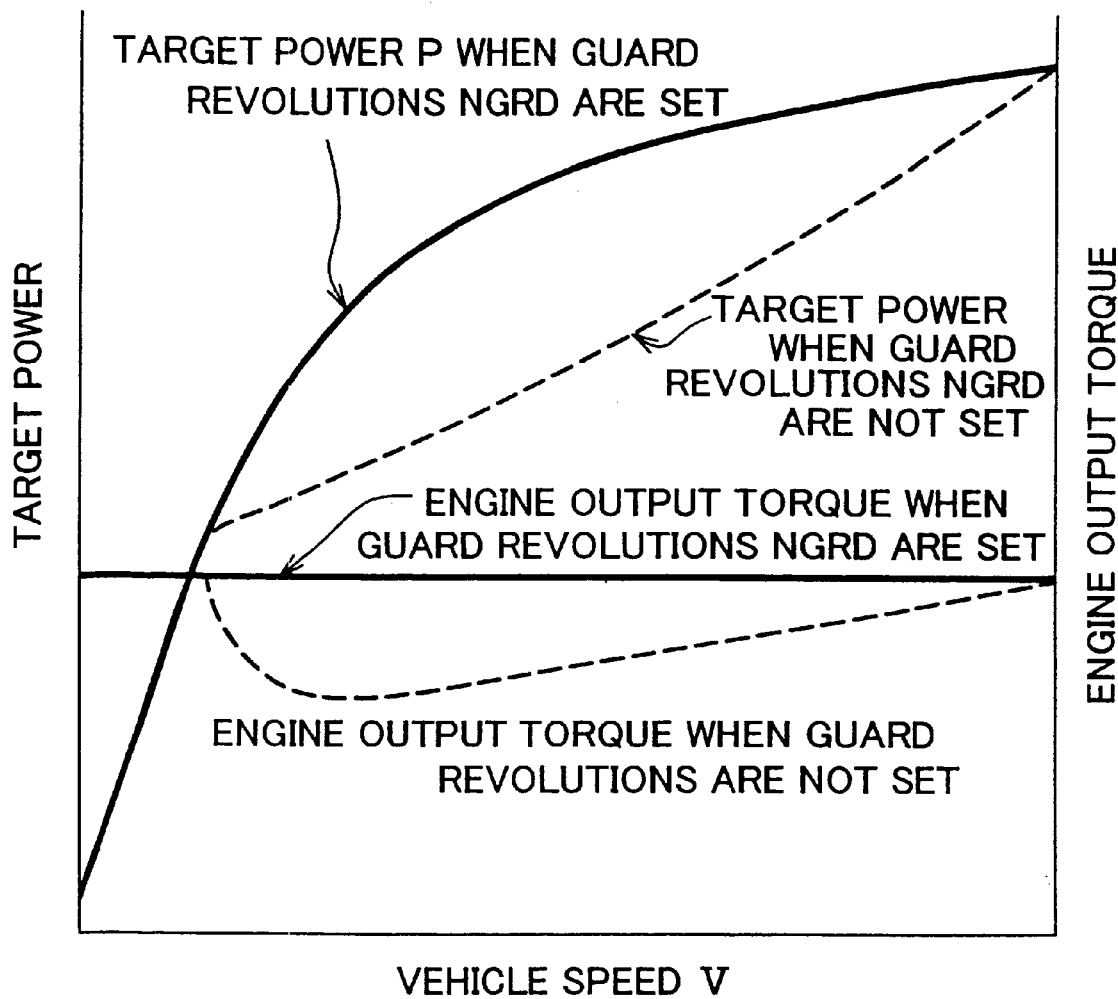
FIG. 8 is a graph showing the relationship between the target power of the engine and a vehicle speed, and showing a relation between the output power of the engine and the vehicle speed, respectively, when the guard revolutions are set as shown in the control in FIG. 6 and when the guard revolutions are not set.

According to this control, the target power P can be set to a value corresponding to a value such as the accelerator angle θ or the like. Furthermore, the target output torque TET can be set on the basis of the target power P. Consequently, the maximum power and the maximum output torque of the engine 1 can be set from the viewpoint of the engine mechanism in the WOT condition. FIG. 8 shows the above-mentioned condition. As the comparison with the aforementioned condition, a case where the guard revolutions NGRD are not set is shown by the dashed line in FIG. 8. In this case, the target power P is controlled relative to the vehicle speed V. As a result, the output torque TE of the engine 1 is lower than the value in the abovementioned condition, as shown in FIG. 8. Consequently, the full potential of the engine performance cannot be drawn. Even though the fuel consumption of the engine 1 is made minimum in the WOT condition, the engine performance is deteriorated.

According to the control of the present invention, the output torque TE of the engine 1 can be maximum in the WOT condition. Furthermore, the output revolutions NE of the engine 1 can be set so that the output revolutions NE increase in accordance with the vehicle speed V. Here, as mentioned above, if the direct clutch 11 is engaged and there is no slip in the hydraulic power transmission 8, the input revolutions NC of the CVT 10 are equal to the output revolutions NE of the engine 1. In this case, the input revolutions NC of the CVT 10 can be treated as the same as the output revolutions NE of the engine 1.

In the above explanation, the belt type CVT is explained as one example of a CVT. The present invention is also applicable to the Troydal type or other type of CVTs.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A control method for controlling a vehicle equipped with a power source and a continuously variable transmission, the continuously variable transmission being connected to the power source, the control method comprising the steps of:

determining a target power of the power source;

determining target revolutions of on the basis of the target power;

determining whether or not the vehicle is in a transient driving condition;

setting the target revolutions as setting revolutions when it is determined that the vehicle is not in the transient driving condition and setting revolutions different from the target revolutions as the setting revolutions when it is determined that the vehicle is in the transient driving condition; and determining a target output torque of the power source on the basis of the target power and the setting revolutions.

2. A control method as set forth in claim 1, further comprising the steps of:

determining a target driving force based on the driving condition of the vehicle;

determining the target power based on the target driving force;

controlling a speed ratio of the continuously variable transmission so that output revolutions of the power source are equal to the target revolutions; and controlling the power source so that an output torque of the power source is equal to the target output torque of the power source.

3. A control method as set forth in claim 1, further comprising the steps of:

determining a target driving force based on the driving condition of the vehicle;

determining the target power based on the target driving force;

controlling a speed ratio of the continuously variable transmission so that input revolutions of the continuously variable transmission are equal to the target revolutions; and controlling the power source so that an output torque of the power source is equal to the target output torque of the power source.

4. A control apparatus in a vehicle equipped with a power source and a continuously variable transmission, the continuously variable transmission being connected to the power source, the apparatus comprising:

a target power determinator for determining a target power of the power source;

a target revolutions determinator for determining target revolutions on the basis of the target power;

determining means for determining whether or not the vehicle is in a transient driving condition;

setting means for setting the target revolutions as setting revolutions when the determining means determines that the vehicle is not in the transient driving condition and for setting revolutions different from the target revolutions as the setting revolutions when the determining means determines that the vehicle is in the transient driving condition; and a target torque determinator for determining a target output torque of the power source on the basis of the target power and the setting revolutions.

5. A control apparatus as set forth in claim 4, wherein the target revolutions are target output revolutions of the power source.

6. A control apparatus as set forth in claim 5, further comprising:

a target force determinator for determining a target driving force based on a driving condition of the vehicle;

speed ratio control means for controlling a speed ratio of the continuously variable transmission so that output revolutions of the power source are equal to the target output revolutions of the power source; and torque control means for controlling the power source so that an output torque of the power source is equal to the target output torque of the power source, and wherein the target power determinator determines the target power of the power source based on the target driving force.

7. A control apparatus as set forth in claim 5, wherein the determining means determines that the vehicle is in the transient driving condition and the setting means sets the output revolutions of the power source as the setting revolutions when a changing amount or a changing rate of an accelerator angle is greater than a predetermined value.

8. A control apparatus as set forth in claim 5, further comprising: target revolutions correction means for replacing the target output revolutions of the power source determined by the target revolutions determinator with guard revolutions, the guard revolutions being preset by setting a vehicle speed as a parameter.

9. A control apparatus as set forth in claim 5, wherein the determining means determines that the vehicle is in the transient driving condition and the setting means sets output revolutions of the power source as the setting revolutions, when an absolute value of a difference between the output revolutions of the power source and the target output revolutions of the power source is equal to or greater than a first predetermined value.

10. A control apparatus as set forth in claim 9, wherein the determining means determines that the vehicle is in the transient driving condition and the setting means sets revolutions which are calculated by assigning weight to the output revolutions and the target output revolutions of the power source as the setting revolutions, when the absolute value of the difference between the output revolutions and the target output revolutions of the power source is less than the first predetermined value and greater than a second predetermined value, the second predetermined value being less than the first predetermined value.

11. A control apparatus as set forth in claim 10, wherein the determining means determines that the vehicle is not in the transient driving condition when the absolute value of the difference between the output revolutions and the target output revolutions of the power source is equal to or less than the second predetermined value.

12. A control apparatus as set forth in claim 4, wherein the determining means determines that the vehicle is in the transient driving condition and the setting means sets the output revolutions of the power source as the setting revolutions when the target output revolutions of the power source are changed stepwise.

13. A control apparatus as set forth in claim 4, wherein the target revolutions are target input revolutions of the continuously variable transmission.

14. A control apparatus as set forth in claim 13, further comprising:
a target force determinator for determining a target driving force based on a driving condition of the vehicle;
speed ratio control means for controlling a speed ratio of the continuously variable transmission so that input revolutions of the continuously variable transmission are equal to the target input revolutions of the power source; and torque control means for controlling the power source so that the output torque of the power source is equal to the target output torque of the power source, wherein the target power determinator determines the target power of the power source based on the target driving force.

15. A control apparatus as set forth in claim 13, wherein the determining means determines that the vehicle is in the transient driving condition and the setting means sets the input revolutions of the continuously variable transmission as the setting revolutions when the target input revolutions of the continuously variable transmission are changed stepwise.

16. A control apparatus as set forth in claim 13, wherein the determining means determines that the vehicle is in the transient driving condition and the setting means sets the input revolutions of the continuously variable transmission as the setting revolutions when a changing amount or a changing rate of an accelerator angle is greater than a predetermined value.

17. A control apparatus as set forth in claim 13, wherein the determining means determines that the vehicle is in the transient driving condition and the setting means sets the lower limit revolutions as the setting revolutions when the input revolutions of the continuously variable transmission are less than predetermined revolutions.

18. A control apparatus as set forth in claim 13, further comprising: target revolutions correction means for replacing the target input revolutions of the continuously variable transmission determined by the target revolutions determinator with guard revolutions, the guard revolutions being preset by setting a vehicle speed as a parameter.

19. A control apparatus as set forth in claim 13, wherein the determining means determines that the vehicle is in the transient driving condition and the setting means sets the input revolutions of the continuously variable transmission as the setting revolutions when an absolute value of a difference between the input revolutions of the continuously variable transmission and the target input revolutions of the continuously variable transmission is equal to or greater than a first predetermined value.

20. A control apparatus as set forth in claim 19, wherein the determining means determines that the vehicle is in the transient driving condition and the setting means sets revolutions which are calculated by assigning weight to the input revolutions and the target input revolutions of the continuously variable transmission as the setting revolutions, when the absolute value of the difference between the input revolutions of the continuously variable transmission and the target input revolutions of the continuously variable transmission is less than the first predetermined value and greater than a second predetermined value, the second predetermined value being less than the first predetermined value.

21. A control apparatus as set forth in claim 20, wherein the determining means determines that the vehicle is not in the transient driving condition when the absolute value of the difference between the input revolutions and the target input revolutions of the continuously variable transmission is equal to or less than the second predetermined value.

* * * * *

UNITED STATES PATENT AND TRADEMARK OFFICE
CERTIFICATE OF CORRECTION

PATENT NO. : 6,345,221 B2  
DATED : February 5, 2002  
INVENTOR(S) : Hattori et al.

It is certified that error appears in the above-identified patent and that said Letters Patent is hereby corrected as shown below:

<u>Title page,</u>
Item [30], Foreign Application Priority information should read:
-- [30]     Foreign Application Priority Data
         Jan. 26, 2000   (JP) ................................. 2000-017558
         May 19, 2000   (JP) ................................. 2000-149088 --

Signed and Sealed this

Third Day of September, 2002

*Attest:*

*Attesting Officer*

JAMES E. ROGAN
*Director of the United States Patent and Trademark Office*